United States Patent [19]

Kannegundla

[11] Patent Number: 5,321,509

[45] Date of Patent: Jun. 14, 1994

[54] APPARATUS AND METHOD FOR CONTROLLING A CHARGE COUPLED DEVICE IMAGE SENSOR TO PROVIDE SEQUENTIAL OUTPUT OF VIDEO IMAGE SIGNALS

[75] Inventor: Ram Kannegundla, Rochester, N.Y.

[73] Assignee: Eastman Kodak Company, Rochester, N.Y.

[21] Appl. No.: 5,326

[22] Filed: Jan. 15, 1993

[51] Int. Cl.$^5$ .................... H04N 5/06; H04N 5/067
[52] U.S. Cl. ........................... 348/521; 348/522; 348/322; 348/222
[58] Field of Search ............... 358/150, 151, 152, 148, 358/149, 160, 209, 213.25, 213.26, 213.27, 213.28, 213.29, 213.31, 906, 909, 224, 140, 11, 335; H04N 5/06, 5/067, 5/04

[56] References Cited

U.S. PATENT DOCUMENTS

| | | | |
|---|---|---|---|
| 4,032,975 | 6/1977 | Malueg et al. | 358/213 |
| 4,169,659 | 10/1979 | Marlowe | 358/150 |
| 4,399,464 | 8/1983 | Hix et al. | 358/213 |
| 4,518,995 | 5/1985 | Harshbarger et al. | 358/150 |
| 4,740,828 | 4/1988 | Kinoshita | 358/48 |
| 4,800,435 | 1/1989 | Ikeda et al. | 358/213.19 |
| 4,811,106 | 3/1989 | Burt et al. | 358/213.26 |
| 4,928,137 | 5/1990 | Kinoshita | 358/213.26 |
| 4,942,468 | 7/1990 | Yokouchi et al. | 358/150 |
| 5,070,406 | 12/1991 | Kinoshita | 358/224 |

*Primary Examiner*—James J. Groody
*Assistant Examiner*—Michael H. Lee
*Attorney, Agent, or Firm*—Raymond L. Owens

[57] ABSTRACT

Apparatus and method for controlling a charge coupled device (CCD) image sensor provides, in accordance with a television standard, horizontal and vertical CCD control signals to obtain a purely sequential mode of operation on the one hand, and alternatively a modified mode of operation to permit image signals to be viewed directly on a standard viewfinder display. The apparatus includes a frequency generator, a standard timing generator, a pixel clock generator, and a small number of additional timers and logic units which are driven by signals from the generators to selectably generate the vertical and horizontal CCD control signals for the alternate modes of operation. The method includes generating a plurality of precisely timed pulses referenced to television standard synchronizing and control signals, and logically combining these pulses and standard signals to generate the vertical and horizontal CCD control signals.

13 Claims, 6 Drawing Sheets

APPARATUS AND METHOD FOR CONTROLLING A CHARGE COUPLED DEVICE IMAGE SENSOR TO PROVIDE SEQUENTIAL OUTPUT OF VIDEO IMAGE SIGNALS

CROSS REFERENCE TO RELATED PATENT APPLICATION

The present invention is related to a co-pending U.S. patent application Ser. No. 08/005,323, which is being filed concurrently with the present patent application, is entitled "Improved Logic System And Method For Controlling Any One Of Different Charge Coupled Device Image Sensors To Provide Video Image Signals In Accordance With A Television Standard," has a common assignee with the present patent application, and has as its inventor, Ram Kannegundla.

FIELD OF THE INVENTION

This invention relates to an electronic apparatus and method for controlling a charge coupled device (CCD) image sensor designed for a sequential mode of operation to provide video images selectably viewable on a standard television display, or directly usable in digital imaging.

BACKGROUND OF THE INVENTION

Recent years have seen the rapid development of CCD image sensors and their present widespread use in television cameras for both amateur and professional applications. Millions of camera units, known as consumer "camcorders," have been purchased by the general public for photographing scenes of everyday life and recording the images on magnetic tape. Their small size, electrical efficiency, cost effectiveness, etc., have made CCD image sensors the imaging units of choice not only for consumer camcorders but for more critical uses where even higher picture resolution is needed. Depending on their intended uses, CCD image sensors are designed either for sequential (progressive) line-by-line readout of their image signals, or instead for "interlaced" readout of each vertical frame of first the odd-numbered lines of image signals and then the even-numbered lines in accordance with a television standard.

In order to facilitate the display of video images produced by a CCD image sensor on a standard television (TV) display, for example, the CCD image sensor is normally designed to operate in accordance with the same "standard" that the TV display uses. In the United States and a number of other countries the "standard" used for TV is that established by the national television standards committee (NTSC). In Great Britain, Germany, and certain other countries the "standard" is PAL ("phase alternation by line"), while in France and many countries in Eastern Europe the "standard" is SECAM ("sequential chrominance and memory"). While there are differences among the various standards, they all require the display of TV pictures in the form of rapidly scanned horizontal lines of vertical frames. Each vertical frame of a picture represents an instantaneous "snapshot" of the scene being imaged and the frames are displayed in rapid succession as in a motion picture. To further minimize visually apparent flicker in the displayed pictures, each frame thereof is made up of an "odd" and an "even" field superimposed on each other in rapid succession. The horizontal scan lines of an "even" field are precisely interlaced with the horizontal scan lines of an "odd" field, and so on. The NTSC "standard" specifies "525" horizontal scan lines per vertical frame, with "262½" lines for each of the "odd" and the "even" fields. This seemingly complicated way of displaying television images is an outgrowth of the development of commercial broadcast television over the past fifty years to the present time. However, this way has served the test of time and is not easily departed from. A much more complete discussion of television (for black and white as well as color) together with the timing, blanking, synchronizing (sync) signals, etc. required by the NTSC "standard" is given in a book entitled *Basic Television and Video Systems*, Bernard Grob, published by McGraw-Hill, Inc., Fifth Edition, 1984.

Where a CCD image sensor is intended for use in digital imaging, as in the printing of color pictures for example, the CCD image sensor is normally designed for sequential, line-by-line-readout of its image signals. This sequential mode of operation is not directly compatible with the "interlaced" mode required for a standard television display.

CCD image sensors are well known in the art. Briefly described, a CCD image sensor has horizontal lines and vertical columns of light-sensing (detectors) cells closely spaced within a given area onto which an image of a scene is optically focused. By way of example, there may be hundreds of such cells in each vertical column and even more cells in each horizontal line for a total of hundreds of thousands of cells within an area which may be only a few square centimeters. Each cell represents a very small area, termed a pixel, of the total image; the more pixels present in the CCD image sensor, the finer the resolution (or apparent lack of grain) in the image reproduced by the CCD image sensor.

A CCD image sensor may have at the beginning of each horizontal line of cells a small number of cells (termed "Z ref" cells) used for determining a zero signal level. Then there are a large number of "active" cells in the line for producing pixel image signals, and finally near the end of the line there are a small number of cells (termed "D ref" cells) for determining a "dark" signal reference level, and several additional "Z ref" cells. One such CCD image sensor commercially available from the Eastman Kodak Co. has a total of 791 cells with 768 "active" cells in each horizontal line, with 9 "Z ref" cells at the beginning of the line, and following the "active" cells 12 "D ref" cells, followed by 2 "Z ref" cells at the end of the line, for a total of 791 cells. There are 484 horizontal lines of these cells arranged in vertical columns. Other CCD image sensors with fewer or greater numbers of active cells per horizontal line are similarly available commercially.

The operation of a CCD image sensor is well known in the art. The active cells of the sensor have their stored image signals (each of which corresponds to the light intensity of a small portion of an image) "read" out pixel by pixel, line by line to provide an electronic video image of a scene. Associated with each column of cells in a CCD image sensor is a separate vertical shift register. In accordance with a broadcast standard for television pictures, (for example, the NTSC "standard"), all of odd-numbered horizontal lines of an image produced by a CCD image sensor are first read out, and then all of even-numbered lines are read out, and so on. Thus at a selected instant of time, the pixel image signals then stored on the cells of the odd-numbered horizontal lines of the CCD image sensor are simultaneously shifted into respective memory positions of the vertical shift registers.

The simultaneous shifting of the multitude of individual pixel signals stored in the CCD cells of the odd-numbered lines into the respective vertical registers takes place within a short time termed "vertical blank" interval. The pixel signals thus stored in the vertical registers represent all of the horizontal lines of an "odd" field of a single frame. The pixel signals stored in all of the vertical registers are next shifted down in parallel at precise intervals within the vertical registers horizontal line by horizontal line and into respective memory positions of a line pixel register (horizontal shift register). There is a memory position in the line pixel register for each one of the vertical registers.

After a single horizontal line of pixels from the vertical registers has been shifted into the line pixel register, the image pixels of that horizontal line are clocked out of the line pixel register by a precisely numbered and spaced cycle of timing pulses (hereinafter termed "pixel clock"). The pixel image signals thus outputted from the line pixel register are applied to other circuitry, such as an analog signal processor (ASP) as is well known in the art. The number of timing pulses in a cycle of the pixel clock corresponds to the number of cells in each horizontal line of cells in the CCD image sensor. This will be explained in greater detail hereinafter.

After all of the horizontal lines of pixel image signals of an "odd" field have been shifted into and clocked out of the line pixel register, the pixel image signals stored on the cells of the even-numbered horizontal lines of the CCD image sensor are simultaneously shifted into the vertical registers and the above-described sequence is repeated line by line for an "even" field. This outputting of the "odd" and "even" fields of each frame is repeated continuously at high speed while being precisely synchronized by vertical and horizontal control signals applied to the CCD image sensor.

As is well known, a television frequency sub-carrier signal (hereinafter termed "fsc") provides for the decoding and display in proper sequence of the color-components (e.g., red, green and blue) of standard television image signals. This is also explained in detail in the above-identified book by Bernard Grob. For ease in synchronizing the outputting of the pixel image signals in each horizontal line of cells of a CCD image sensor, in accordance with a television standard, the number of cells in a horizontal line is made a convenient multiple of the frequency sub-carrier ("fsc"). This will be explained in greater detail hereinafter. For the NTSC "standard", the "fsc" is 3.5795 MHz.

The synchronizing (sync) and control signals for a standard television system (e.g., NTSC) are well suited to the needs of cathode ray tube monitors such as used in virtually all present-day television receivers. Generic standard timing generators specifically designed for producing these "standard" sync and control signals are commercially available off-the-shelf at low cost from a number of companies. However, the standard sync and control signals produced by these commercially available timing generators are not directly usable as the vertical and horizontal control signals needed for a CCD image sensor, such as described above. This is especially so where sequential, rather than "interlaced", readout of the lines of image signals is required.

A camcorder imaging system, having a CCD image sensor, typically uses a generic timing generator for generating "standard" signals to control a miniature, very inexpensive video display (with interlaced lines of "odd" and "even" fields for each picture frame) for use in a viewfinder for the camcorder. It is desirable from the standpoint of cost and convenience to be able to use such a generic standard timing generator and a miniature video display viewfinder, both of which are readily available commercially, in an imaging system where sequential readout of the lines of video signals of a CCD image sensor is required.

The present invention provides a simple, inexpensive and versatile imaging system which incorporates a television standard timing generator and a standard viewfinder display, and which provides vertical and horizontal control signals for purely sequential readout of the lines of video signals of a CCD image sensor and alternatively for viewing of the video signals in the viewfinder display.

SUMMARY OF THE INVENTION

In accordance with the present invention, in one aspect thereof, there is provided a logic system for controlling a CCD image sensor intended for purely sequential outputting of each picture frame of video image signals to produce, when desired, output video image signals displayable in accordance with a television standard (e.g., the NTSC standard) requiring interlaced even and odd fields of the picture frame. This logic system has a generic timing generator which produces standard sync and control signals as required by a television display. The generic timing generator is driven by a frequency generator whose frequency is made a multiple of a standard frequency sub-carrier ("fsc"). A pixel clock generator, also driven by the frequency generator, provides a pixel clock each cycle of which has a pre-determined number of pixel timing pulses corresponding to the number of cells (pixels) per horizontal line of a particular CCD image sensor being used with the logic system. Signals from the timing generator and the pixel clock generator are applied to a small number of timers and logic units to provide horizontal and vertical control signals for the CCD image sensor. Certain ones of these timers and logic units are selectably controlled to provide horizontal and vertical control signals as needed for a purely sequential line-by-line readout of pixel image signals from the CCD image sensor. Alternatively, the timers and logic units are selectably controlled to provide control signals in accordance with a modified mode of readout of the pixel image signals in which the signals are directly viewable on a standard television display.

In accordance with another aspect of the invention, there is provided a method for controlling a CCD image sensor to obtain lines of video images synchronized in groups of even and odd fields for display in accordance with a television standard and alternatively to obtain video images which are outputted from the CCD image sensor sequentially line-by-line and frame-by-frame. The method comprises the steps of generating standard sync and control signals as required by a standard television display, generating a pixel clock, generating a plurality of timed pulses referenced to the standard signals, generating horizontal CCD control signals from a logical combination of the pixel clock and ones of the timed pulses, generating vertical CCD control signals having a selectable number of vertical shift pulses from a logical combination of ones of the timed pulses, generating vertical CCD control signals having a selectable number of frame shift pulses from a logical combination of ones of the timed pulses and the standard signals, and selecting the numbers of vertical shift pulses and frame shift pulses in accordance with a purely sequential mode of outputting single horizontal lines of pixel image signals from the CCD image sensor and alternatively in accordance with a modified mode of outputting lines of pixel image signals in groups of even and odd fields of a frame of a television picture.

In accordance with yet another aspect of the invention, there is provided a logic system for generating synchronizing (sync) and control signals in accordance with a television standard and for selectably generating horizontal and vertical control signals as required by a charge coupled device (CCD) image sensor for a purely sequential mode of outputting image signals and alternatively for a modified mode of outputting in which the image signals are viewable directly on a standard television display. The logic system comprises timing generator means, pixel clock generating means, and selectively controlled timing and logic means. The timing generator means generates standard sync and control signals in accordance with a television standard, and is referenced to a standard frequency. The pixel clock generating means provides pixel clock signals having repeating cycles each of which has a pre-determined number of pixel timing pulses in accordance with requirements of the CCD image sensor. The pixel clock generating means is referenced to the standard frequency. The selectably controlled timing and logic means, which is driven by pixel clock and standard sync and control signals, generates horizontal and vertical control signals for the CCD image sensor as needed for a purely sequential mode of outputting of a vertical frame of horizontal lines of pixel image signals line-by-line from the CCD image sensor and alternatively as needed for a modified mode of outputting from the CCD image sensor groups of horizontal lines of pixel image signals in odd and even fields of a vertical frame of a television picture.

The invention will be better understood from a consideration of the following detailed description given in conjunction with the accompanying drawings and claims.

DETAILED DESCRIPTION

Figure 1:
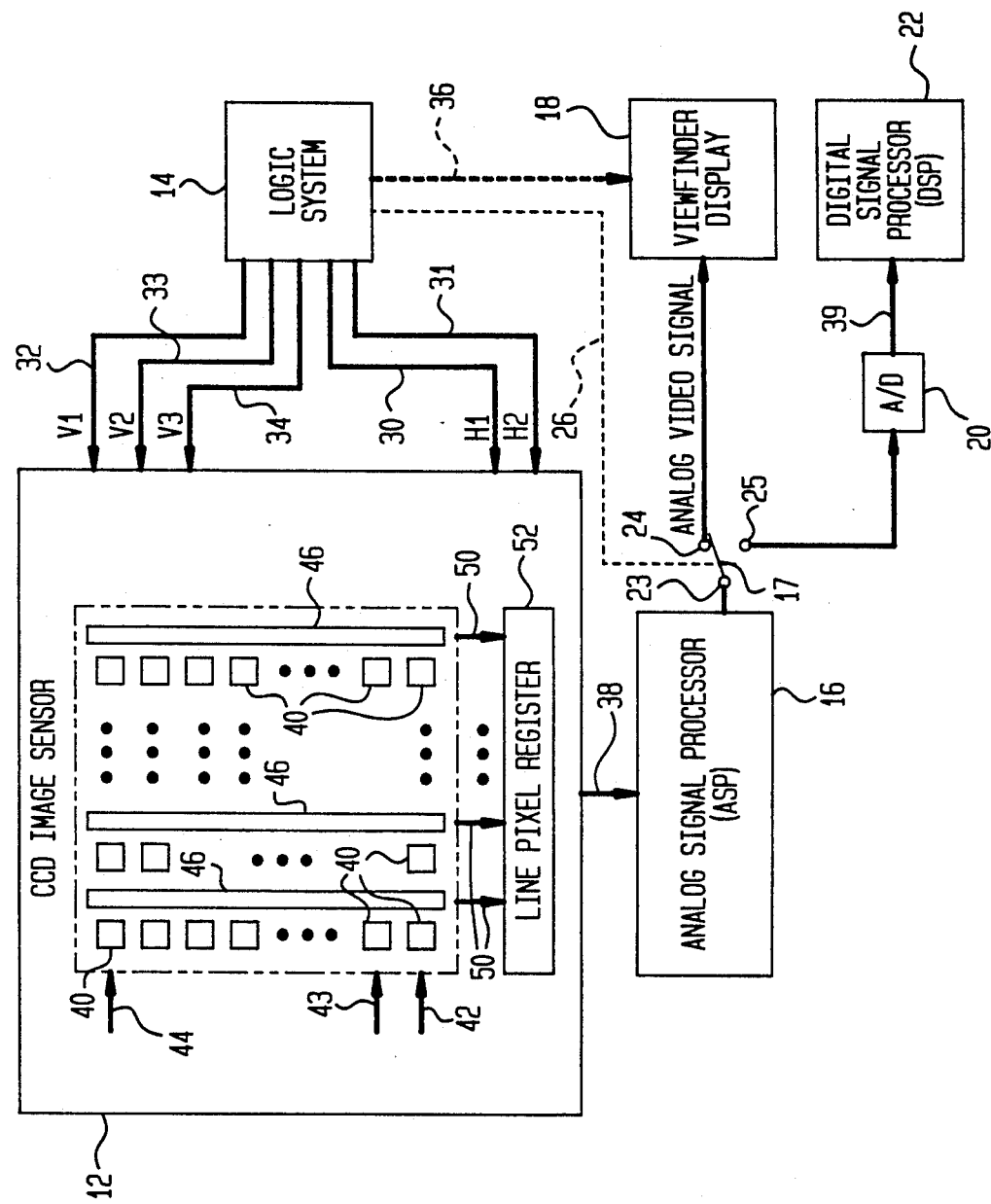
FIG. 1 is a schematic block diagram of a video imaging system in accordance with the present invention.

Referring now to FIG. 1, there is shown a schematic block diagram of a video imaging system 10 in accordance with the present invention. The system 10 comprises a CCD image sensor 12, (shown within a solid-line rectangle and being well known in the art), a novel logic system 14, an analog signal processor (ASP) 16 also well known, a switch 17, a television viewfinder display 18, an analog to digital (A/D) converter 20, and a digital signal processor (DSP) 22. Image signals from the DSP 22 may, for example, be applied to a color printer (not shown).

The switch 17 has an input terminal 23 connected to an output of the ASP 16, and has an upper terminal 24 connected to an input of the display 18, and has a lower terminal 25 connected to an input of the A/D converter 20. The switch 17 is controlled by means (not otherwise shown) indicated by the dashed line 26, as will be explained hereinafter.

The logic system 14, which is described in detail hereinafter, applies horizontal control signals H1 and H2 to the CCD image sensor 12 via leads 30 and 31, respectively. The logic system 14 also applies vertical control signals V1, V2 and V3 to the CCD image sensor 12 via leads 32, 33 and 34, respectively. Sync and control signals (not shown) in accordance with a television "standard" may be applied by the logic system 14 to the viewfinder display 18 via a multi-channel cable 36 (shown by a dashed-line). Pixel image signals outputted from the CCD image sensor 12 are applied via a lead 38 to the ASP 16, and analog video signals from the ASP 16 are applied at output terminal 23 via the switch 17 either to the viewfinder display 18 or to the A/D converter 20 and thence via a lead 39 to the DSP 22.

The CCD image sensor 12 has drive circuits (not shown) which are well known in the art and which are controlled by the horizontal control signals H1 and H2 (which are complements of each other). The drive circuits are also controlled by the vertical control signals V1 and V2 (which are complements of each other), and by the vertical control signal V3. These horizontal and vertical control signals, their relationships to each other, and how they are generated by the logic system 14, are described in detail hereinafter. These horizontal and vertical control signals provide for sequential outputting of the lines of pixel image signals of the CCD image sensor 12.

The CCD image sensor 12, as is well known, has a multitude of closely spaced cells 40 arranged in horizontal lines and vertical columns. A first horizontal line of cells 40 is indicated by a horizontal arrow 42, a second horizontal line of cells is indicated by a horizontal arrow 43, and so on to a last horizontal line of cells indicated by a horizontal arrow 44. Associated with each vertical column of cells 40 is a respective one of vertical shift registers 46 (only three are shown). In each shift register 46 there are memory positions (not shown) adapted to receive at a selected instant all of the pixel image signals of the cells 40 in a given column. This selective, precisely timed shifting of the pixel image signals from all of the cells 40 into the vertical shift registers 46 is described in greater detail hereinafter.

After the vertical registers 46 have been loaded with all of the horizontal lines of pixel image signals, those pixel image signals (corresponding to the first line 42) then in the first memory position (not shown) of the vertical registers 46 are, as indicated by short downward arrows 50, shifted in one cycle in parallel into respective memory positions (not shown) of a line pixel register 52. There is a respective memory position (not shown) in the line pixel register 52 for receiving the output of each one of the vertical registers 46. After the line pixel register 52 has been loaded in a given cycle with the pixel image signals of a single horizontal line (e.g., the first line 42), the pixel image signals of that line are clocked out of the line pixel register 52 pixel-by-pixel and applied via the lead 38 to the ASP 16. This horizontal readout operation of the line pixel register 52 is controlled by the horizontal control signals H1 and H2 applied to the CCD image sensor 12, as will be explained in detail hereinafter.

The sequential line-by-line shifting into and readout of pixel image signals from the line pixel register 52 continues until the last horizontal line 44 of pixel image signals have been outputted to the ASP 16. At this point the vertical registers 46 are now empty. Then another precisely timed vertical control signal applied to the CCD image sensor 12 simultaneously shifts all of the next pixel image signals from all of the horizontal lines of cells 40 into the vertical registers 46. After this, the above-described sequence is repeated in clocking the pixel image signals out of the pixel image register 52, sequentially line-by-line, until all of the horizontal lines of the CCD image sensor 12 have been outputted, and so on. It is important to note that the vertical and horizontal control signals applied to the CCD image sensor 12 by the logic system 14 are precisely referenced with respect to standard sync and control signals required by the viewfinder display 18. Thus video signals from the CCD image sensor 12 and the ASP 16 are directly viewable on the viewfinder display 18. The video signals outputted as sequential lines of pixel image signals from the CCD image sensor 12 and the ASP 16 are also directly usable with the A/D converter 20 and the DSP 22. This desirable result is obtained in a highly effective way by the simple and inexpensive apparatus and method provided by the present invention.

Figure 2:
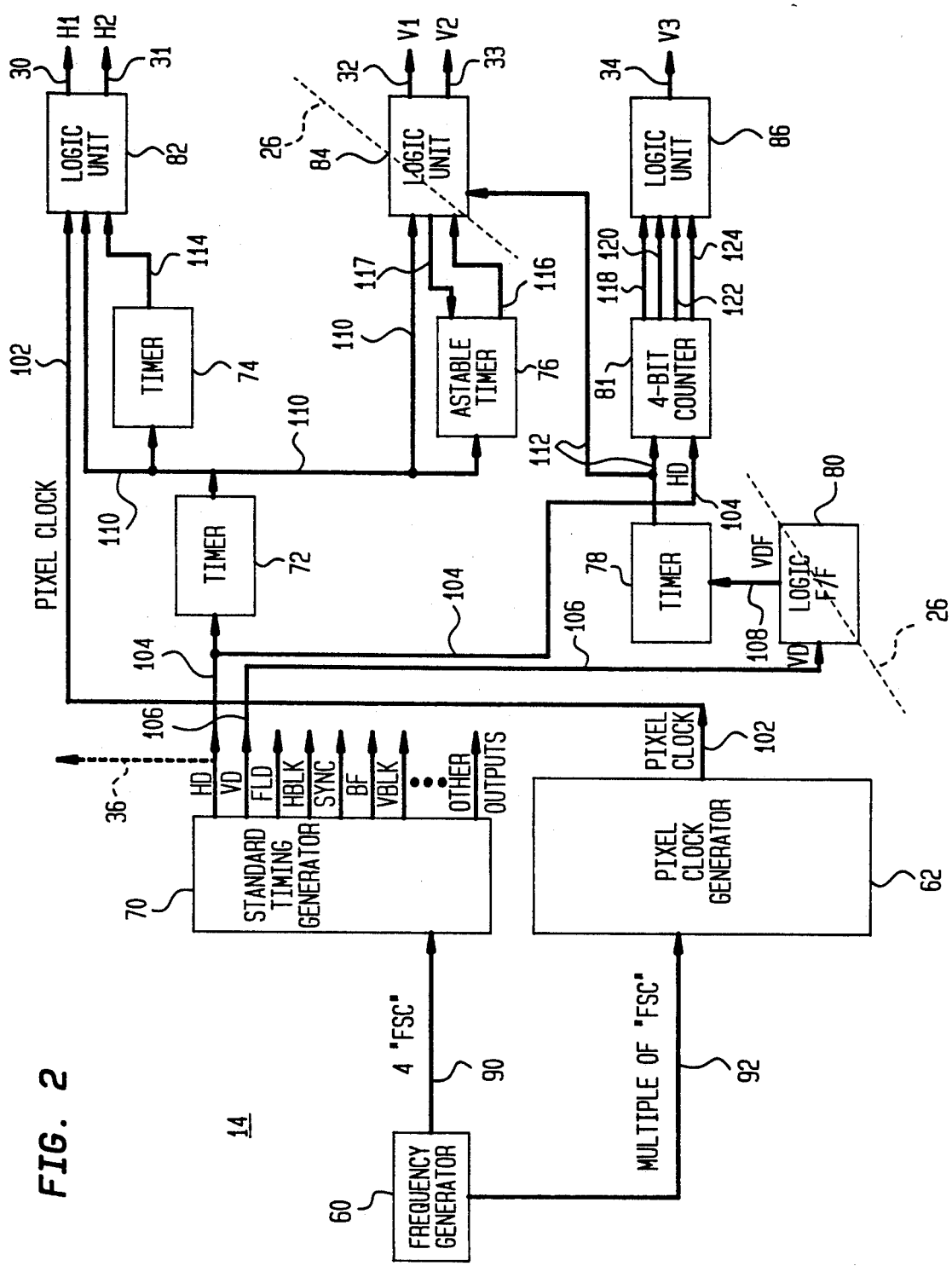
FIG. 2 is an illustrative schematic diagram of a logic system of FIG. 1 in accordance with the present invention.

Referring now to FIG. 2, there is shown a schematic diagram in accordance with the present invention of the logic system 14 of FIG. 1. The logic system 14 comprises a frequency generator 60, a pixel clock generator 62, a standard timing generator 70, a timer 72, a timer 74, an astable timer 76, a timer 78, a logic flip-flop (F/F) 80, a 4-bit counter 81, and a plurality of logic units 82, 84 and 86. By way of example, the sync and control signals generated by the standard timing generator 70 described hereinafter are in accordance with the NTSC standard.

The logic system 14 outputs to the CCD image sensor 12 of FIG. 1 horizontal control signals H1 and H2, via the leads 30 and 31, respectively, and the vertical control signals V1, V2, and V3 via the leads 32, 33 and 34, respectively. Required ones of the sync and control signals generated by the timing generator 70 may be outputted from the logic system 14 to the viewfinder display 18 of FIG. 1 by the multi-channel cable 36, indicated as a dashed line.

The frequency generator 60 operates at a pre-determined multiple of a standard frequency sub-carrier "fsc" (e.g., 12 "fsc"). In accordance with the NTSC standard, an output signal of 4 "fsc" from the generator 60 is connected via a lead 90 to an input of the standard timing generator 70. The timing generator 70 is thus synchronized with a four times multiple of the "fsc" which is 14.3182 MHz.

A signal having a frequency of a selected multiple of "fsc" is applied via a lead 92 from the frequency generator 60 to the pixel clock generator 62. In a co-pending patent application, which is being filed simultaneously with the present application and in which there is the same inventor and a common assignee as herein, entitled "Improved Logic System And Method For Controlling Any One of Different Charge Coupled Device Image Sensors to Provide Video Image Signals In Accordance With A Television Standard", Ser. No. 08/005,323, there is described in detail how the signal frequency applied via the lead 92 to the pixel clock generator 62 is selected to correspond to the number of pixels (cells 40) in a horizontal line of the CCD image sensor 12. By way of example here, the frequency of the signal on the lead 92 is selected to be 4 times "fsc" (i.e., 14.3182 MHz) when the CCD image sensor 12 has 791 cells 40 per horizontal line.

The pixel clock generator 62 generates a pixel clock, described in detail hereinafter, which is outputted onto a lead 102. During each cycle of the pixel clock the pixel clock generator 62 generates a train of pixel pulses, which, as was explained previously, correspond in number to the number of cells 40 in a horizontal line thereof in the CCD image sensor 12. The pulses of the pixel clock applied to the lead 102 are, as will be explained hereinafter, precisely referenced to each other and to the beginning and ending of each horizontal line of pixel image signals from the line pixel register 52 of FIG. 1 in accordance with the television (NTSC) standard.

The standard timing generator 70 (which may be purchased off-the-shelf at low cost) generates a number of sync and control signals and applies them to respective output leads. Principal ones of these signals are identified here as: "horizontal drive" (HD), "vertical drive" (VD), "odd and "even" field indicator" (FLD), "horizontal blank" (HBLK), "synchronizing" (SYNC), "burst flag" (BF), and ""vertical blank"" (VBLK). Other signals not specifically identified herein may also be generated by the generator 70. Certain ones of the identified signals HD, VD, FLD, etc. and their time relationships to other signals generated by the logic system 14 are described in greater detail hereinafter.

The HD signal from the timing generator 70 is applied via a common lead 104 to an input of the timer 72 and to one input of the 4-bit counter 81. The VD signal from the timing generator 70 is applied via a lead 106 to an input of the logic flip-flop 80. A signal (hereinafter identified as "VDF") is applied via a lead 108 from the logic flip-flop 80 to the timer 78. The pixel clock from the pixel clock generator 62 is applied via the lead 102 to one input of the logic unit 82. An output of the timer 72 is applied via a common lead 110 to another input of the logic unit 82, to an input of the timer 74, to one input of the logic unit 84, and to an input of the astable timer 76. An output of the timer 78 is applied via a common lead 112 to one input of the 4-bit counter 81, and to one input of the logic unit 84. An output of the timer 74 is applied via a lead 114 to another input of the logic unit 82. An output of the astable timer 76 is applied via a lead 116 to another input of the logic unit 84; and a control signal from the logic unit 84 is applied via a lead 117 to another input of the astable timer 76, as will be explained hereinafter.

Four outputs of the 4-bit counter 81 are applied by respective ones of leads 118, 120, 122 and 124 to separate inputs of the logic unit 86. The operation of the portion of the logic system 14 comprising the timers 72, 74, 76 and 78, the logic flip-flop 80, the 4-bit counter 81, and the logic units 82, 84 and 86 will be described in greater detail hereinafter. These components individually are well known in the art and may be purchased off-the-shelf at low cost.

Figure 3:
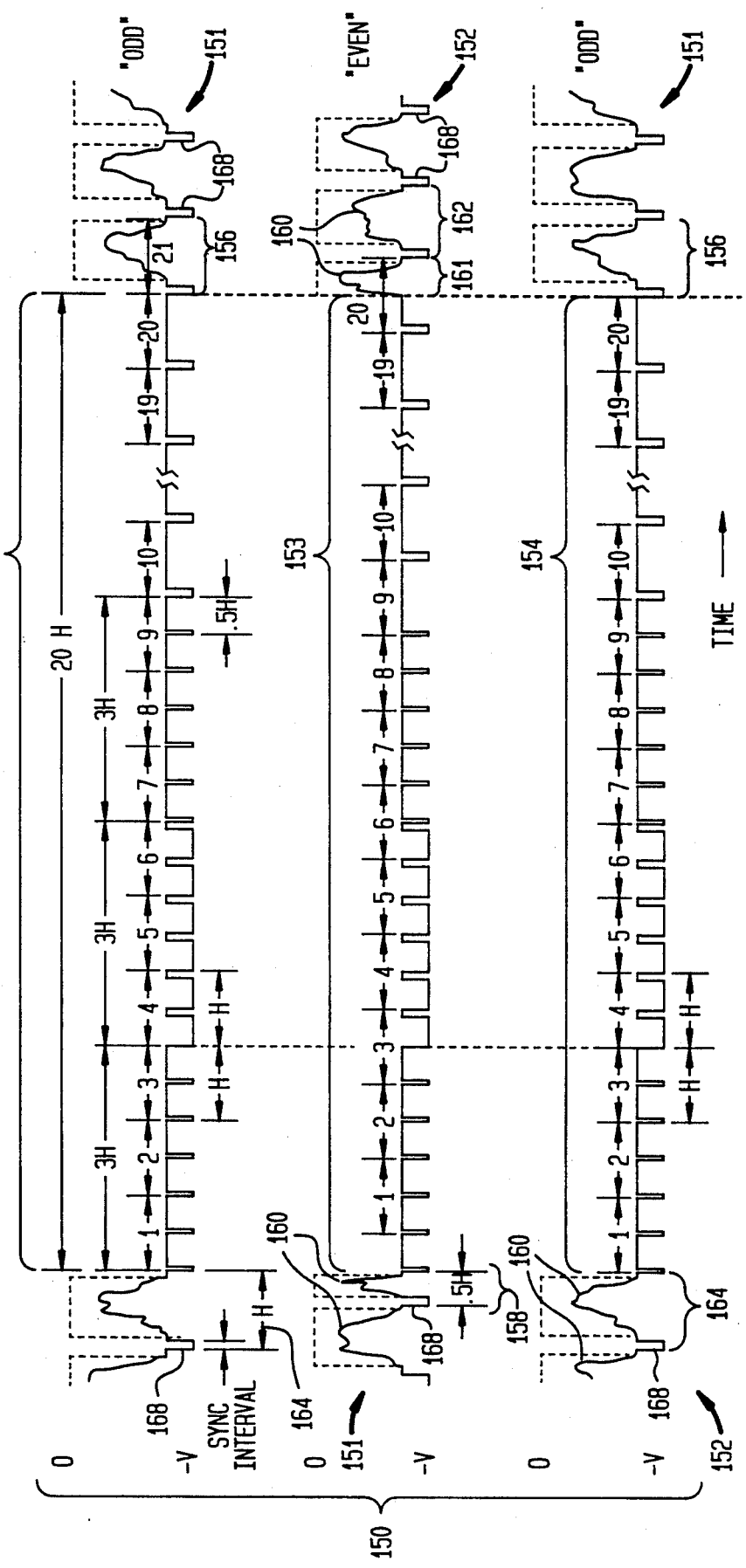
FIG. 3 is a schematic diagram of video image signals provided in accordance with the NTSC standard.

Referring now to FIG. 3, there is shown, by way of background explanation, a television signal schematically indicated at 150 and provided in accordance with the NTSC standard. A much more complete discussion of television signals is to be found in the above-identified book by Bernard Grob. Time is indicated here along a horizontal axis and relative signal amplitude in volts along a vertical axis. The signal 150 is displayed sequentially line-by-line as an "odd" field indicated at 151, an "even" field indicated at 152, and "odd" field at 151, and so on. It is noted that only the beginning and ending portions of the "odd" and "even" fields are shown. The end of an "odd" field 151 and a next "even" field 152 are separated by a ""vertical blank"" interval indicated at 153, and the end of an "even" field 152 and a next "odd" field 151 are separated by a "vertical blank" interval 154. Various synchronizing pulses shown during the "vertical blank" intervals 153 and 154 are well known in the art and are not further described herein.

During each "vertical blank" interval 153 or 154 twenty horizontal lines "H" (20 H) of the video portion of the signal 150 are blanked out. This provides time for vertical retrace from the end of one field to the beginning of the next, and so on. There are "262½" horizontal lines H in each of the fields 151 and 152 for a total of "525" lines in a vertical frame of the television picture. The frames are repeated 30 times a second, with the two fields thereof repeated at 60 times per second.

Beginning with the twenty-first line H, as indicated at 156, of an "odd" field 151, two hundred forty two full lines of the television signal 150 are displayed, followed by one half of a line H indicated at 158 at the end of an "odd" field 151. The video portion of the signal 150 during a horizontal line is indicated at 160. At the end of an "odd" field there is another "vertical blank" interval 153 followed by one-half of the twentieth line H indicated at 161 of the next "even" field 152. This half-line 161 is followed by a full twenty-first line, as indicated at 162, of the "even" field, and so on. Each "even" field ends in a full line, as indicated at 164, and then another "vertical blank" interval 154 begins. The time duration of a full line H, such as indicated at 156, 162 and 164, is termed "one line time". Each line H is initiated by a horizontal line sync pulse 168 applied during a very short "sync interval". It is to be noted that the horizontal line sync pulses 168 for each "odd" field are offset by a half line-time with respect to the line sync pulses 168 for an "even" field. Thus an "odd" field 151 ends with a half-line as indicated at 158 and an "even" field 152 begins with a half-line as indicated at 161, and so on.

Figure 4:
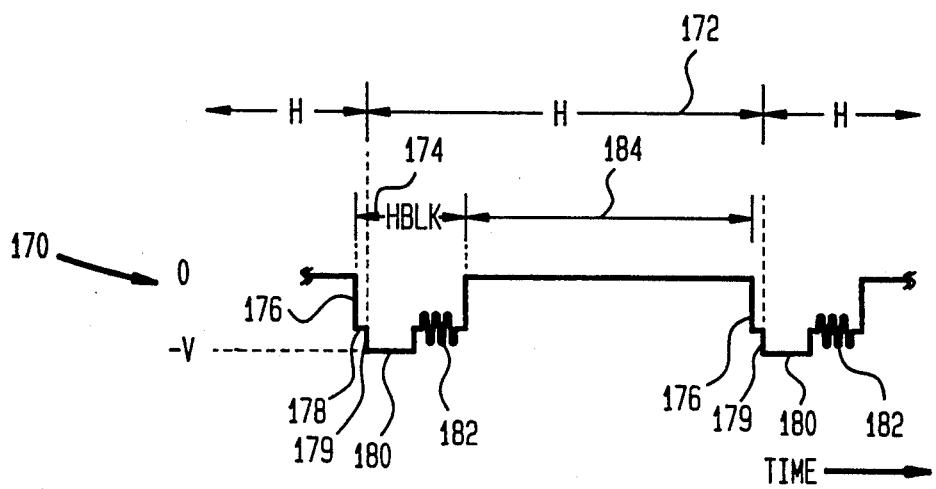
FIG. 4 is an actual waveform illustrating portions of a video signal for one standard horizontal line of a vertical frame.

Referring now to FIG. 4, there is shown greatly enlarged a waveform 170 of the end of one horizontal line H of a television signal (e.g., the signal 150 of FIG. 3), the following full horizontal line H of the signal from beginning to end, and the beginning portion of the next line H. Time is indicated to scale along a horizontal axis, and arbitrary signal voltage amplitude relative to zero along a vertical axis. For the sake of illustration here, the video portion (e.g., the portion 160 of FIG. 3) of the waveform 170 is shown at zero amplitude. The time duration of one line (H) is indicated at 172. This time 172 corresponds to the duration of the full lines 156, 162 and 164 of FIG. 3. In accordance with the NTSC standard, the line time 172 is 63.5 microseconds.

Shortly before the beginning of a line H there is an interval termed "horizontal blank" (HBLK) as indicated at 74. During the HBLK interval 174 there is a combined pulse 176. The combined pulse 176 has a level at 178 at which blanking of the video portion 160 of the television signal 150 (FIG. 3) occurs. The pulse 176 has a transition 179 to a sync pedestal 180, which corresponds to a horizontal sync pulse 168 (FIG. 3). At the end of the sync pedestal 180 the combined pulse 176 has a short oscillating portion 182, termed "burst flag" (BF) by which the color components of the video signal are decoded. The BF portion 182 comprises a number of oscillations of the standard frequency sub-carrier "fsc", as is well known in the art. A BF signal, like the BF portion 182, is generated by the timing generator 70. After the HBLK interval 174 there is an active portion 184 of the line H extending to the next HBLK interval 174, during which video image signals (not shown here) are displayed. The active line portion 184 has a time of 55.31 microseconds according to the NTSC standard. The video pixel image signals, (e.g., the video portion 160 of FIG. 3), are outputted, as was explained previously, from the line pixel register 52 of FIG. 1 pixel image signal by pixel image signal corresponding to a horizontal line of cells 40 in the CCD image sensor 12. To obtain from the CCD image sensor 12 properly synchronized signals for each line (such as illustrated at 156, 158, 161, 162 and 164 in FIG. 3), it is essential that the pixel clock applied to the lead 102 (FIG. 2) have the proper number of pixel timing pulses (corresponding to the number of cells 40 in a horizontal line) and that each cycle of the pixel clock be precisely referenced to the line time 172, and to the active line interval 184 of FIG. 4. Also, during each HBLK interval 174, a horizontal line of pixel image signals must be shifted at a precisely synchronized instant from the vertical registers 46 of the CCD image sensor 12 of FIG. 1 into the line pixel register 52 of FIG. 1.

Figure 5:
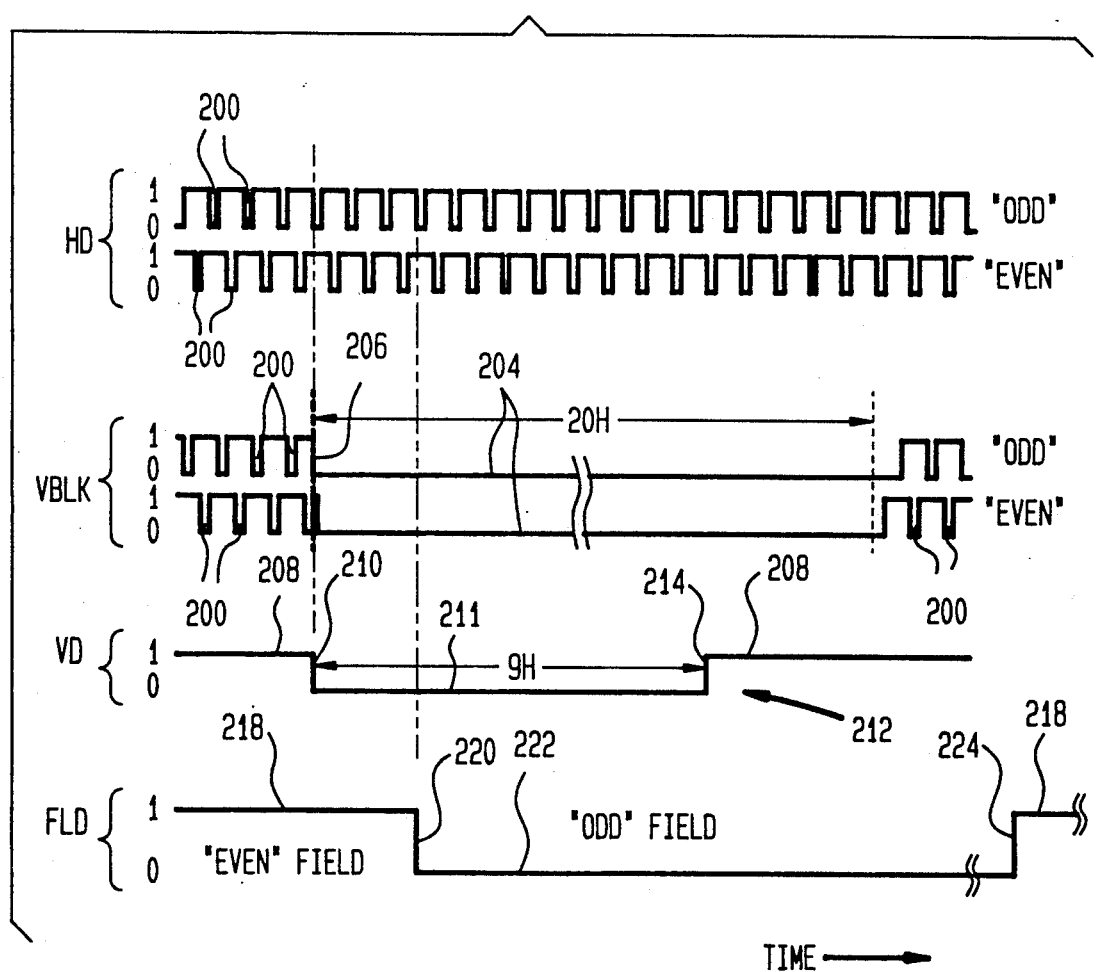
FIG. 5 shows in schematic form certain standard sync and control signals generated by a timing generator in accordance with the NTSC standard.

Referring now to FIG. 5, there are schematically shown certain of the standard output signals generated by the timing generator 70 of FIG. 2. Time is indicated along a horizontal axis and signal logic levels of binary "0" and "1" along a vertical axis. These signals are only briefly described herein since they are well known. A first one of the signals shown here is the horizontal drive (HD) signal which (see also FIG. 2) is applied to the lead 104. The HD signal comprises a series of sync pulses 200 which are evenly spaced by "one line time" (i.e., the time 172 of FIG. 4) and which correspond to the horizontal sync pulses 168 (FIG. 3). It is noted that the HD sync pulses 200 shown here for an "even" field are offset by one-half of the line time relative to the HD sync pulses 200 for an "odd" field. This conforms with the evenly spaced timing of the standard horizontal sync pulses 168 previously described (FIG. 3).

A "vertical blank" (VBLK) signal generated by the timing generator 70 (applied to an output lead identified as VBLK in FIG. 2) has a twenty-line (20 H) blanking interval indicated at 204 for both the "odd" and "even" fields. The blanking intervals 204 begin at a transition indicated at 206 and are referenced to the HD sync pulses 200 for the "odd" and "even" fields, as shown. These blanking intervals 204 correspond to the standard vertical blank intervals 153 and 154 (FIG. 3).

A vertical drive (VD) signal (applied to the lead 106 in FIG. 2) has a first level (shown as logic "1") indicated at 208 which at a transition 210 goes to a second level (shown as logic "0") 211 to form a pulse 212. The transition 210 is matched in time with the transition 206 of the VBLK signal. The second level 211 of the VD signal pulse 212 has a duration of nine line-times (9 H) after which the VD signal at a transition 214 returns to the first level 208.

An "odd" and "even" field indicator (FLD) signal (applied to the lead 108 in FIG. 2) has a first level (logic "1") 218 (indicating an "even" field) which at a first transition 220 goes to a second level (logic "0") 222 (indicating an "odd" field). At the end of an "odd" field the FLD signal goes from the second level 222 at a second transition 224 back to the first level 218. The first transition 220 of the FLD signal occurs three line-times after the transition 210 of the VD signal, as does the second transition 224.

Synchronizing (SYNC) signals generated by the timing generator 70 and applied to an output lead (identified as SYNC in FIG. 2) are not shown herein but correspond to the standard sync pulses 168 and other sync pulses (not numbered) within the "vertical blank" intervals 153 and 154 (FIG. 3). Similarly, other signals generated by the timing generator 70 are not illustrated herein but are well known in the art.

Figure 6:
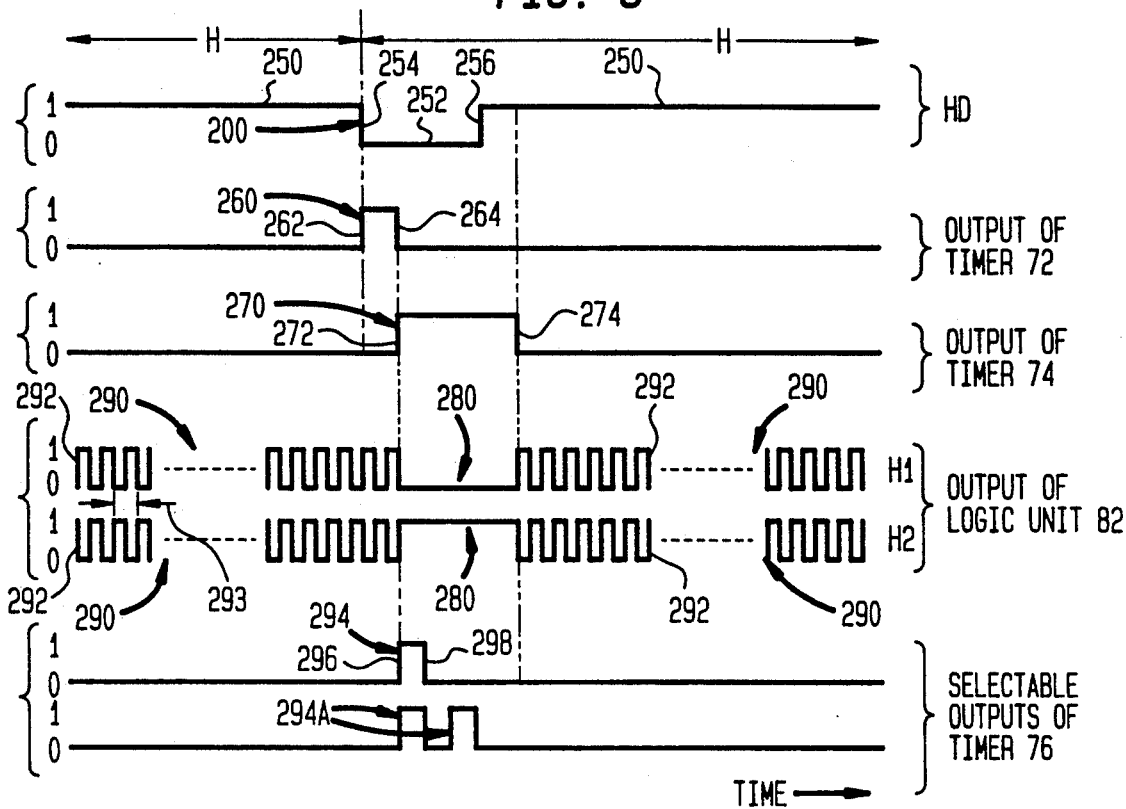
FIG. 6 is a schematic illustration of certain timed pulses and shows a logical combination of pulses and a pixel clock to provide horizontal control signals in accordance with the invention for a CCD image sensor of FIG. 1.

Referring now to FIG. 6, there are shown in schematic form some important time relationships of various signals and timed pulses generated within the logic system 14 of FIG. 2. Time is shown along a horizontal axis and signal logic levels of "0" and "1" are shown along a vertical axis. A single sync pulse 200 of the HD signal (see also FIG. 5) is shown going from a first level ("1"), 250 to a second level ("0") 252 at a transition 254 and then at a later transition 256 back to the level 250. The transition 254 marks the beginning of the next line H and the end of the previous line, as indicated. The exact relationship of the sync pulses 200 of the HD signal to the standard sync pulses 168 of FIG. 3, the HBLK intervals 174 (FIG. 4), and the VBLK intervals 204 of FIG. 5 has previously been described.

Shown positioned below the sync pulse 200 is a precisely timed pulse 260 which is generated by the timer 72 of FIG. 2 at the beginning of each HD signal pulse 200. The timed pulse 260 begins at a transition 262 (coincident with the transition 254) and ends shortly afterward at a transition 264 even though the sync pulse 200 is still present (i.e., at a "0"). The pulse 260 is applied to the lead 110 of FIG. 2.

The trailing edge (transition 264) of the timed pulse 260 triggers the timer 74 of FIG. 2 which produces a timed pulse 270. The pulse 270 begins at a transition 272 and ends at a transition 274. It is noted that the transition 272 occurs at the same time as does the transition 264, and that the transition 274 occurs somewhat after the transition 256 of the HD sync pulse 200. Thus the timed pulse 270 (which is applied via the lead 114 to an input of the logic unit 82 in FIG. 2) begins only after a precisely set interval (determined by the pulse 260) after a HD sync pulse 200 occurs. The timed pulse 270 continues for a precisely set interval (determined by the timer 74) until shortly after the HD sync pulse 200 has ended.

The pulses 260 (from timer 72), the pulses 270 (from timer 74), and the pixel clock on the lead 102 (FIG. 2) are logically combined, in a way well known in the art, in the logic unit 82 to produce an output horizontal control signal H1 and its complement H2. As schematically illustrated in FIG. 6, the horizontal control signal H1 (with logic levels "0" and "1"), and the complementary horizontal control signal H2, (with logic levels "0" and "1") has a "blanked-out" portion 280 during which the pixel clock indicated at 290 is interrupted. The pixel clock 290 comprises evenly spaced pixel timing pulses 292. The pixel timing pulses 292 are in the form of a square wave having a 50% duty cycle and a period indicated at 293. For a drive signal of 4 "fsc" applied to the pixel clock generator 62, the period 293 is "one" divided by 4 "fsc". Each timing pulse 292 in the horizontal control signals H1 and H2 drives the line pixel register 52 of FIG. 1 to output a single pixel image signal. There are provided here as many timing pulses 292 in a single cycle of the horizontal control signals H1 and H2 as are required to output from the line pixel register 52 all of the active pixel image signals as well as the beginning and ending "D ref" and "Z ref" signals from a horizontal line of cells 40 of the CCD image sensor 12. The exact position and duration of the "blanked-out" intervals 280 within the horizontal control signals H1 and H2 are referenced as shown to the HD sync pulses 200.

Shown below the horizontal control signals H1 and H2 of FIG. 6 is a timed pulse 294 having logic levels of "0" and "1". The pulse 294 (generated by the astable timer 76 of FIG. 2) begins at a transition 296 which coincides with the transition 264 at the end of the pulse 260. The pulse 294 ends at a transition 298 which occurs shortly before the transition 274 at the end of the pulse 270 from the timer 74. The interval defined by the pulse 294 is thus precisely referenced to the HD signal pulse 200, to the timed pulse 260 (timer 72) and to the interval 280 of the horizontal control signals H1 and H2. The single pulse 294 is selectably generated by the astable timer 76 under control (via the lead 117) from the logic unit 84.

Shown positioned below the pulse 294 are two pulses 294A which are also selectably generated by the astable timer 76. When selected, the first of the pulses 294A is generated in time instead of the pulse 294, and the second pulse 294A occurs shortly after the first pulse 294A.

The logic unit 84 has a signal selector (not shown) which is actuated by the control means 26 (indicated by the dashed line) in unison with the switch 17 of FIG. 1. When the switch 17 is in the "up" position shown (i.e., the terminal 23 connected to the terminal 24), video signals from the ASP 16 are applied to the viewfinder display 18. The signal selector (not shown) in the logic unit 84 at this time applies via the lead 117 a control signal to the astable timer 76 which commands it to output the two pulses 294A via the lead 116 to the logic unit 84. Alternatively, when the switch 17 is set in its "down" position (i.e., the terminal 23 connected to the terminal 25) by the control means 26, the signal selector (not shown) in the logic unit 84 applies via the lead 117 to the astable timer 76 a control signal which commands the timer 76 at this time to output only a single pulse 294. The single pulse 294 and alternatively the double pulses 294A are referenced to the HD signal pulses 200 as shown.

In response to a single pulse 294, a single horizontal line of pixel image signals in the vertical registers 46 of the CCD image sensor 12 of FIG. 1 is shifted into the line pixel register 52. On the other hand, in response to a pair of the pulses 294A, two successive horizontal lines of pixel image signals are shifted one on top of the other into the line pixel register 52. This in effect combines the two lines into a "double line" of pixel image signals to be shifted as a single line out of the line pixel register 52. The pulses 294, and the pair of pulses 294A, are hereinafter referred to as "vertical shift" pulses. A precisely numbered sequence of the vertical shift pulses 294 (or pulses 294A) comprises a cycle of a vertical clock (to be described shortly).

There are as many of the vertical shift pulses 294 in a cycle of the vertical clock as there are horizontal lines of pixel image signals of the CCD image sensor 12 to be shifted sequentially line-by-line into the line pixel register 52 of FIG. 1. By way of example, where the CCD image sensor 12 has "484" horizontal lines of cells 40, there are 484 of the single vertical shift pulses 294 in a cycle of the vertical clock. During a cycle of the vertical clock the lines of pixel image signals are outputted in sequence by the vertical shift pulses 294 to the line pixel register 52 and thence to the ASP 16. For this purely sequential mode of operation of the imaging system 10, the switch 17 is in its "down" position and the analog video signals from the ASP 16 are applied to the A/D converter 20 and thence to the DSP 22. This cycle of the vertical clock (e.g., with 484 single vertical shift pulses 294) corresponds in length of time to the odd-field and even-field portions of a single "frame" of a standard television picture (e.g., 30 frames per second).

On the other hand, there is a modified mode of operation of the imaging system 10 when the switch 17 is in its "up" position. As was explained previously, when the switch 17 is put into its "up" position by the control means 26, the logic unit 84 is conditioned by the control means 26 to apply via the lead 117 a control signal (not shown) to the astable timer 76 which causes the astable timer 76 to output onto lead 116 the pair of vertical shift pulses 294A (FIG. 6), instead of a single pulse 294. On the occurrence of a pair of the pulses 294A, two horizontal lines of pixel image signals are shifted one on top of the other into the line pixel register 52. Following the example given above, where there are "484" horizontal lines in the CCD image sensor 12, "242" pairs of the pulses 294A sequentially shift in pairs all of the horizontal lines of pixel image signals into the line pixel register 52. These 242 "double lines" represent an entire vertical frame of a picture being imaged by the CCD image sensor 12.

Figure 7:
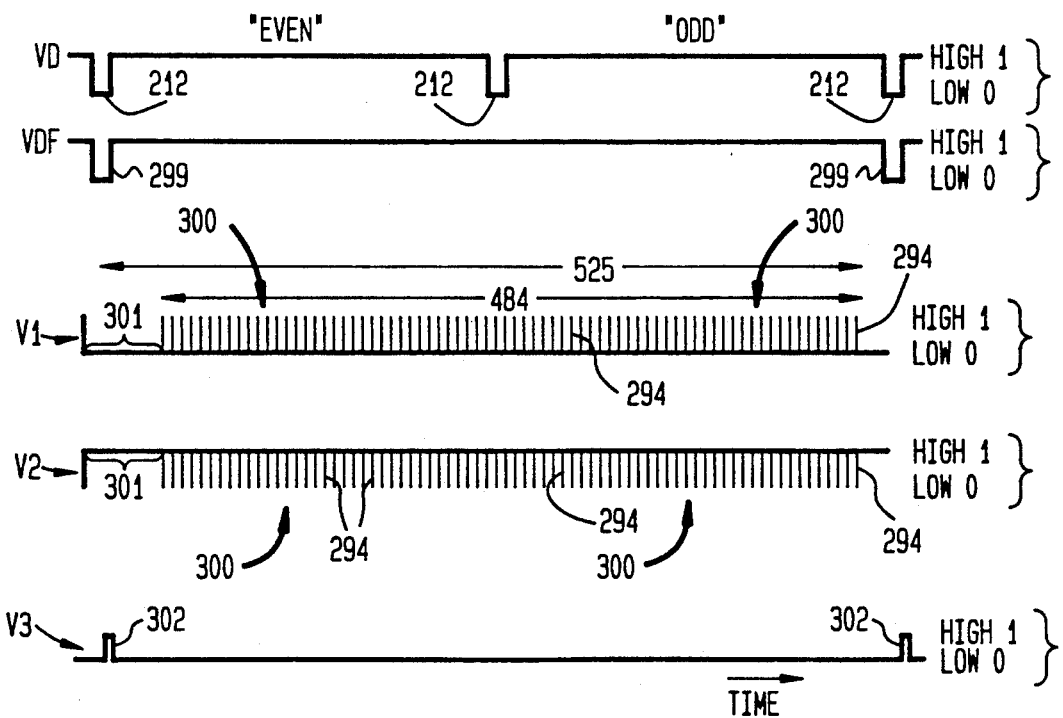
FIG. 7 is a schematic illustration of vertical control and other signals provided in accordance with the invention for a purely sequential mode of operation of the CCD image sensor of FIG. 1.

Referring now to FIG. 7, there are shown (not to scale) time relationships of various signals generated by the logic system 14 of FIG. 2 for a purely sequential mode of operation of the CCD image sensor 12. Time is indicated along a horizontal axis and logic levels "high" (a "1") and "low" (a "0") along a vertical axis. The switch 17 is in a "down" position and single pulses 294 are generated. Evenly spaced VD signal pulses 212 (see also FIG. 5), and their relationship to the "even" and "odd" fields of a single frame of a standard TV picture are as shown here. These pulses 212 are applied via the lead 106 to the logic flip-flop 80 (FIG. 2). The output signal VDF (lead 108) of the logic flip-flop 80 as shown here comprises a sequence of pulses 299 (two shown) which occur after every other VD signal pulse 212. Thus there is no VDF signal pulse 299 generated when a VD signal pulse 212 occurs at the beginning of an odd-field of the picture frame. This permits a normal sequential mode of operation of the imaging system 10 (switch 17 "down"). During a time corresponding to the "even" and the "odd" fields of a standard TV picture frame ("525" lines in total), all of the horizontal lines of pixel image signals of a vertical frame (e.g., 484 lines) are sequentially outputted line-by-line from the CCD image sensor 12.

Shown (for the sake of explanation) positioned below the VD and VDF signals are the vertical control signals V1 and V2 (which are complements of each other), and the vertical control signal V3. The vertical control signal V1 (and the complementary signal V2) comprises a vertical clock 300, one cycle of which has, for example, "484" the single vertical shift pulses 294 (FIG. 6), only a nominal number of which are actually depicted. As will be explained in detail shortly, there is a blanked-out interval indicated at 301 at the beginning of the vertical control signals V1 and V2.

The vertical control signal V3 comprises a sequence of pulses 302 which, as will be explained in greater detail shortly, are referenced to the VDF signal pulses 299 and are generated by the logic unit 86. On the occurrence of each V3 signal pulse 302, all of the horizontal lines of pixel image signals of a vertical frame are shifted into the vertical registers 46 of the CCD image sensor 12. Thereafter the pixel image signals are outputted sequentially line-by-line from the CCD image sensor 12 as was explained previously. The pulses 302 are hereinafter referred to as "frame shift" pulses.

Figure 8:
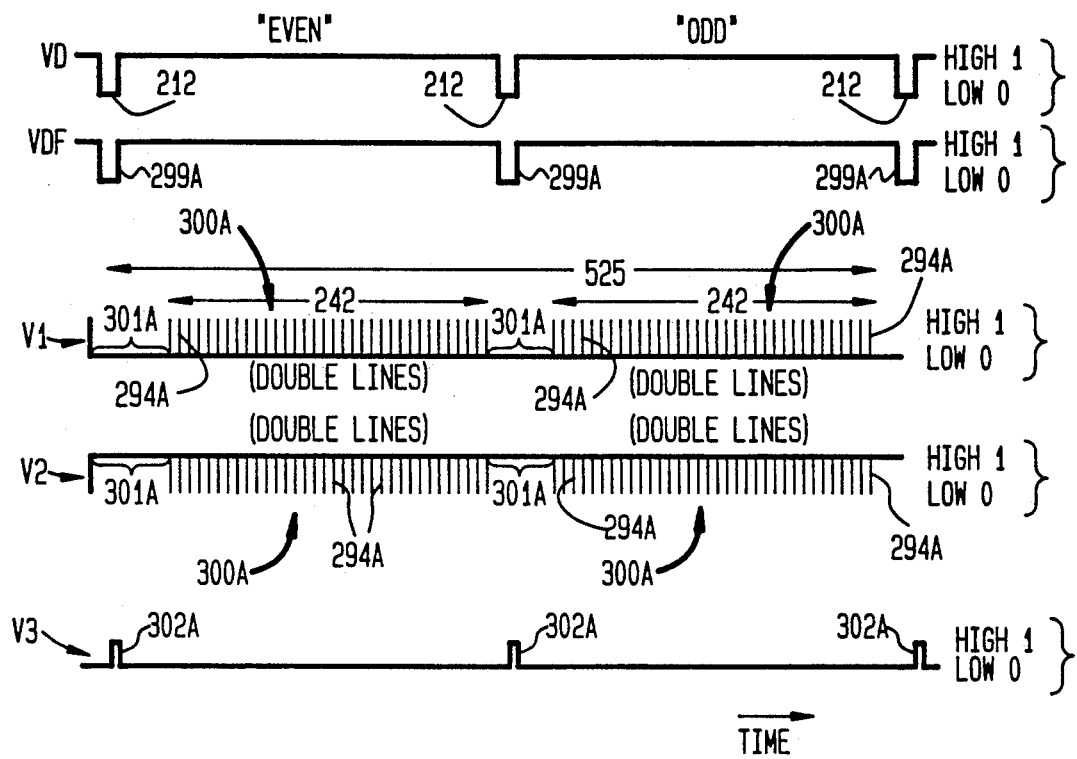
FIG. 8 is a schematic illustration of vertical control and of other signals provided in accordance with the invention for a modified mode of operation of the CCD image sensor of FIG. 1.

Referring now to FIG. 8, there are shown time relationships of various signals generated by the logic system 14 for a modified mode of operation of the CCD image sensor 12. Time is indicated along a horizontal axis and logic levels along a vertical axis (similar to FIG. 7). The switch 17 for the modified mode of operation illustrated here has been set by the control means 26 in the "up" position and the astable timer 76 generates the pair of vertical shift pulses 294A (FIG. 6). The VDF signal now comprises sequential pulses 299A (three shown) occurring respectively with every VD signal pulse 212. And there is a frame shift pulse 302A in the vertical control signal V3 for every pulse 299A.

The vertical control signals V1 and V2, as shown in FIG. 8, now comprise vertical clock cycles 300A, each cycle 300A in turn comprising "242" of the pairs of pulses 294A (each of the pairs being shown here for convenience as a single pulse). There is a blanked-out interval 301A at the beginning of each of the cycles of the vertical clock 300A. With each V3 frame shift pulse 302A there are 484 horizontal lines of pixel image signals shifted into the vertical registers 46 and sequentially outputted as 242 "double lines" from the CCD image sensor 12 during a respective even-field and also during an odd-field portion of the vertical control signals V1 and V2. These "even" and "odd" fields of "double lines", though slightly different from "even" and "odd" fields of single lines as in standard TV signals, are nonetheless directly viewable as a TV picture on the viewfinder display 18.

Figure 9:
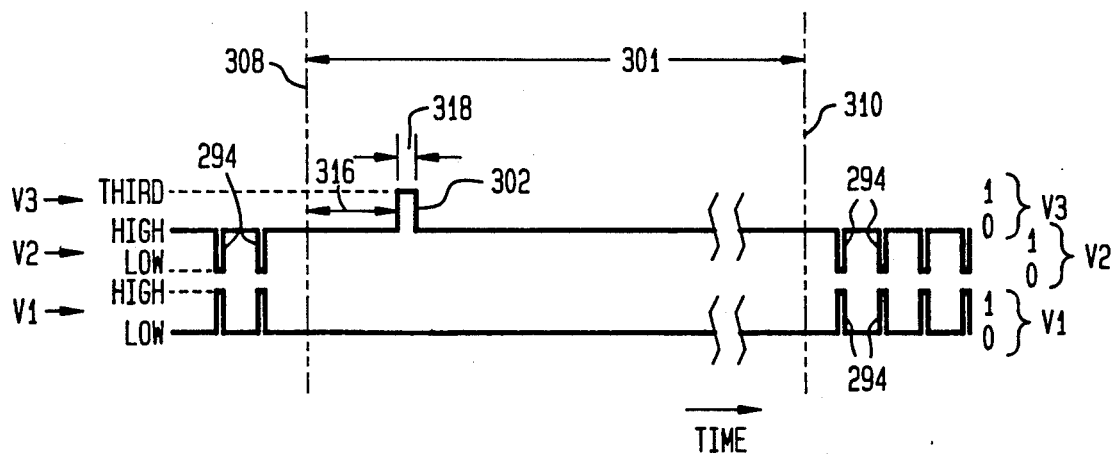
FIG. 9 shows enlarged portions of the vertical control signals and schematically illustrates their relation to each other.

Referring now to FIG. 9, there are, for ease of explanation, schematically shown further enlarged (relative to FIG. 7) the beginning of an "even" field portion of the vertical control signals V1 and V2. A frame shift pulse 302 of the vertical control signal V3 is also shown in relation to the signals V1 and V2. Time (not exactly to scale) is indicated along the horizontal axis and signal logic levels of "0 and "1 and combined levels illustrating "low", "high" and "third" logic levels are indicated along the vertical axis. After the last vertical shift pulse 294 (see also FIG. 6) in an "odd" field portion there is the blanked-out interval 301 (see also FIG. 7) at the beginning of the next "even" field portion of the vertical control signals V1 and V2. The blanked-out interval 301 (determined by the timer 78 as will be explained shortly) begins at a time indicated by a vertical line 308 and ends at a time indicated by a vertical line 310. During the blanked-out interval 301, the vertical sync pulses 294 are eliminated from the vertical control signals V1 and V2. Each blanked-out interval 301 is precisely referenced to the HD signal (lead 104) and to the VDF signal (lead 108) as will be explained shortly. It should be noted that for the sake of illustration here, the position of the vertical control signal V2 is shown above the position of the signal V1.

A frame shift pulse 302 of the vertical control signal V3 is shown for the sake of explanation superimposed on (though not part of) the vertical control signal V2. The pulse 302 begins a short interval, indicated by 316, after the beginning at the time 308 of the blanked-out interval 301. The duration of the pulse 302 is indicated by 318. The generation by the logic system 14 of the frame shift pulses 302 of the vertical control signal V3, and the blanked-out interval 301 of the vertical control signals V1 and V2 will be described in detail hereinafter.

The presence of the frame shift pulse 302 of the vertical control signal V3 in effect provides, as shown here, a "third" signal logic level in addition to the two logic levels "low" and "high" of the vertical control signal V2 by itself. This permits the drive circuits (not shown) within the CCD image sensor 12 to recognize each frame shift pulse 302 of the vertical control signal V3 as a command to shift all of the lines of pixel image signals of a vertical frame into the vertical registers 46.

It is noted that during the "odd" field portion of the vertical control signal V1 and V2 (see FIG. 7), there is no frame shift pulse 302 of the vertical control signal V3 during the sequential mode of operation of the CCD image sensor 12 (switch 17 "down"). Thus the drive circuits (not shown) of the CCD image sensor 12 do not attempt at the beginning of an "odd" field to shift the horizontal lines of pixel image signals into the vertical registers 46.

It is to be understood that when the imaging system 10 is conditioned for the modified mode of operation (switch 17 "up") described previously (FIG. 8), the pair of pulses 294A are generated instead of the single pulse 294. Thus instead of each single pulse 294 shown in FIG. 9, there are a pair of the pulses 294A. And the frame shift pulse 302 of the vertical control signal V3 of FIG. 9 now becomes a respective one of the frame shift pulses 302A (FIG. 8), and the blanked-out interval 301 becomes a respective one of the blanked-out intervals 301A (FIG. 8).

By way of example, the duration of the blanked-out interval 301 (or 301A) is twenty line-times (20 H) and it is referenced to the VDF signal (lead 108), as will be explained shortly. The frame shift pulse 302 (or 302A) of the vertical control signal V3 begins about two line-times after the blanked-out interval 301 begins, being also referenced to the HD signal. The pulse 302 (or 302A) has a duration of about one line-time. Both the single vertical sync pulses 294 and the pairs of pulses 294A of the vertical control signals V1 and V2 are referenced to the HD signal (FIG. 6). Thus in the modified mode of operation illustrated in FIG. 8, the first pair of vertical sync pulses 294A which appears after each "odd" and after each "even" blanked-out interval 301A ends occurs at the precise time required (see FIG. 3) for viewing on the television viewfinder display 18 the "odd" and "even" fields of "double lines" of the video signal from the CCD image sensor 12.

The complementary vertical control signals V1 and V2 of FIGS. 7 and 8 are generated by the logic unit 84 (leads 32 and 33) from a logical combination of the timed pulse 260 (lead 110), the timed pulse 294 or pulses 294A (FIG. 6) generated by the astable timer 76 (lead 116), and a signal (not shown) generated by the timer 78 (lead 112) and having a duration equal to the blanked-out interval 301 (FIG. 9).

The logic flip-flop 80 is selectably set by the control means 26 to generate, during the sequential scan mode of operation (switch 17 "down"), a pulse 299 of the VDF signal (lead 108) in response to each "even" field pulse 212 of the VD signal (but no pulse 299 for an "odd" field pulse 212, as shown in FIG. 7). When the imaging system 10 is set for the modified mode of operation (switch 17 "up") in which the analog video signal is applied to the viewfinder display 18, the logic flip-flop 80 generates a VDF signal pulse 299A for each VD signal pulse 212 (FIG. 8). The timer 78 responds to each VDF signal pulse 299, or 299A and generates a signal on the lead 112 corresponding to the blanked-out intervals 301 (FIG. 7) or the blanked-out intervals 301A (FIG. 8).

The 4-bit counter 81 is enabled by the signal (not shown but lasting for the interval 301 or 301A) generated by the timer 78 on the lead 112. Thereafter, in response to the HD signal on the lead 104, the 4-bit counter 81 generates binary bit pulses (not shown) representing "one", "two", "four" and "eight" line-times on the respective leads 118, 120, 122 and 124. The logic unit 86 receives these binary bit pulses (not shown) and logically combines them. In response to the input signals, the logic unit 86 generates the frame shift pulses 302 (or 302A) of the vertical control signal V3 (lead 34). The timing and referencing of the frame shift pulses 302 (or 302A) of the vertical control signal V3, and the blanked-out intervals 301 (or 301A) of the complementary vertical control signals V1 and V2 have previously been described (FIGS. 7, 8 and 9).

The seemingly complex task of generating "standard" (NTSC) sync and control signals needed by a television viewfinder on the one hand, and the generating of precisely referenced though substantially different horizontal and vertical control signals needed by a CCD image sensor for a purely sequential mode of operation on the other hand, is accomplished in a simple and highly effective way by the above described apparatus and method provided by the present invention. The logic system 14 is controlled in absolute synchronism by a single frequency generator 60 operating at a pre-determined multiple of a standard frequency sub-carrier "fsc". A standard timing generator 70 operates at a multiple (e.g., 4) of the "fsc" to produce standard sync and control signals for a conventional television system. The pixel clock generator 62 generates a pixel clock 290 having a number of pixel timing pulses 292 per cycle selected in accordance with the particular CCD image sensor 12 used with the logic system 14. The HD signal, and the VD signal from the standard timing generator 70, and the pixel clock from the pixel clock generator 62 are then applied to another portion (comprising a small number of inexpensive components which may be purchased off-the-shelf) of the logic system 14. This portion of the logic system 14 selectably generates the horizontal and vertical control signals needed by the CCD image sensor 12 for a purely sequential mode of operation on the one hand, and for a modified mode of operation on the other hand, as previously described. These horizontal and vertical control signals are inherently referenced to and synchronized with a television standard (e.g., NTSC). There is no redundancy of elements in this new logic system 14 and thus it is highly cost effective.

The standard timing generator 70 can be Part No. CX-7930A NTSC, PALM, sold by Sony Corporation. It provides output sync and control signals in accordance with the NTSC standard, and also the PAL standard. The viewfinder display 18 can be part number DXF-3000, from Sony Corporation. The timers 72, 74, 76 and 78 are commercially available, for example, from Texas Instruments Co. as part number 74HC123 and 555. The logic flip-flop 80 and logic units 82, 84 and 86 comprising logic gates and inverters are commercially available, for example, from Texas Instruments as part numbers 74HC00, 74HC04, 74HC08, and 74HC32. The pixel clock generator 62 is a commercially available pulse generator. The various other components employed in the logic unit 14 are well known in the art and are commercially available from a number of suppliers.

Various changes in the apparatus and method disclosed may occur to those skilled in the art and can be made without departing from the spirit and scope of the invention as set forth in the accompanying claims. In particular, the invention is not limited to any particular number of horizontal lines (e.g., 484) in a CCD image sensor, or to a given television standard (e.g., NTSC), or to the particular components of the logic system 14 which have been specifically described. Modifications in the sequences of generating the horizontal control signals and the vertical control signals for the CCD image sensor 12 by the logic system 14 may be made without departing from the invention.

What is claimed is:

1. A logic system for generating synchronizing (sync) and control signals in accordance with a television standard and for selectably generating horizontal and vertical control signals as required by a charge coupled device (CCD) image sensor for a purely sequential mode of outputting image signals and alternatively for a modified mode of outputting in which the image signals are viewable directly on a standard television display, the logic system comprising:

timing generator means for generating standard sync and control signals in accordance with a television a standard, the timing generator means being referenced to standard frequency;

pixel clock generating means for providing pixel clock signals having repeating cycles each of which has a pre-determined number of pixel timing pulses in accordance with requirements of the CCD image sensor, the pixel clock generating means being referenced to the standard frequency; and selectably controlled timing and logic means, which is driven by pixel clock and standard sync and control signals, for generating horizontal and vertical control signals for the CCD image sensor as needed for a purely sequential mode of outputting of a vertical frame of horizontal lines of pixel image signals line-by-line from the CCD image sensor and alternatively as needed for a modified mode of outputting from the CCD image sensor groups of horizontal lines of pixel image signals in odd and even fields of a vertical frame of a television picture.

2. The logic system of claim 1 wherein the selectably controlled timing and logic means comprises:

a plurality of timers adapted to provide respective pulses of pre-determined durations referenced to ones of the standard sync and control signals;

first logic means for generating the horizontal control signals from a logical combination of the pixel clock and at least one of the respective pulses;

second logic means for selectably generating vertical shift vertical control signals from a logical combination of ones of the respective pulses and the standard sync and control signals;

third logic means for selectably generating frame shift vertical control signals from a logical combination of others of the respective pulses; and control means coupled to the second and third logic means for selectably controlling them in unison to provide vertical control signals for purely sequential line-by-line readout of a vertical frame of pixel image signals from the CCD image sensor and alternatively to provide vertical control signals for modified readout of groups of horizontal lines of pixel image signals in even and odd fields of a vertical frame of a television picture such that pictures can be selectably viewed directly on a standard television display.

3. The logic system of claim 2 wherein the timing generator means operates in accordance with a national television standards committee (NTSC) standard requiring 525 horizontal lines of a vertical frame in interlaced even and odd fields of about 242 lines each; and the second and third logic means are selectably controlled by the control means to output sequentially all of the horizontal lines of a vertical frame of pixel image signals from the CCD image sensor, and alternatively to output groups of about 242 lines from the CCD image sensor in even and odd fields of a vertical frame of a standard television picture frame.

4. The logic system of claim 3 wherein the groups of about 242 lines comprise 484 single horizontal lines of a vertical frame of the CCD image sensor combined into 242 double lines of pixel image signals for each even and odd field of a standard television picture frame.

5. A logic system for generating standard synchronizing (sync) and control signals in accordance with a television standard and for generating horizontal and vertical control signals required by a charge coupled device (CCD) image sensor for alternative modes of operation, the logic system comprising:

a frequency generator adapted to provide signals referenced to a standard television frequency subcarrier (fsc);

a standard timing generator adapted to be driven by a signal from the frequency generator and adapted to provide standard sync and control signals in accordance with a televisions standard;

a plurality of timers adapted to generate signals having respective durations and being precisely referenced to each other and to ones of the standard sync and control signals;

a pixel clock generator adapted to generate a pixel clock, the pixel clock generator being adapted to be driven by a signal from the frequency generator;

a plurality of logic units adapted to generate horizontal and vertical CCD control signals from a logical combination of respective ones of the pixel clock, the timer signals, and the standard sync and control signals; and control means for controlling the logic units to provide for a purely sequential mode of operation of the CCD image sensor in which single horizontal lines of pixel image signals are outputted line-by-line for each frame of a picture and to provide for a modified mode of operation in which groups of horizontal lines of pixel image signals are outputted in interlaced even and odd fields of a television picture frame.

6. The logic system of claim 5 in which the logic units generate a selectable number of vertical shift pulses in one vertical control signal, and generate a selectable number of frame shift pulses in another vertical control signal, the numbers of the vertical shift pulses and the frame shift pulses being selected by the control means in accordance with the sequential mode and the modified mode of operation of the CCD image sensor.

7. The logic system of claim 5 which is:
the plurality of timers comprise first second and third timers and an astable timer;
the plurality of logic units comprise first second and third logic units and a logic flip-flop; and
the control means actuates signal selectors in one of the logic units and in the logic flip-flop.

8. The logic system of claim 7 wherein the astable timer is controlled by a signal selector in one of the logic units, and the logic flip-flop controls another of the timers.

9. A video imaging system comprising:
a CCD image sensor having a vertical frame of horizontal lines of pixels;
analog signal means coupled to the CCD image sensor for providing analog video signals;
a viewfinder display;
digital signal means;
switch means for selectably coupling video signals from the analog signal means to the display and alternatively from the analog signal means to the digital signal means; and
logic means for generating synchronizing (sync) and control signals in accordance with a television standard and for selectably generating horizontal and vertical control signals as required by a the (CCD) image sensor for a purely sequential mode of outputting image signals therefrom and alternatively for a modified mode of outputting in which the image signals are viewable directly on the display, the logic means comprising:
timing generator means for generating standard sync and control signals in accordance with a television standard, the timing generator means being referenced to a standard frequency;
pixel clock generating means for providing pixel clock signals having repeating cycles each of which has a pre-determined number of pixel timing pulses in accordance with requirements of the CCD image sensor, the pixel clock generating means being referenced to the standard frequency; and selectably controlled timing and logic means which is driven by pixel clock and standard sync and control signals for generating horizontal and vertical CCD control signals as needed for a purely sequential mode of outputting of the vertical frame of horizontal lines of pixel image signals line-by-line from the CCD image sensor and alternatively as needed for a modified mode of outputting from the CCD image sensor groups of horizontal lines of pixel image signals in odd and even fields of a vertical frame of a television picture.

10. The video image system of claim 9 in further combination with control means for controlling in unison the switch, and the selectably controlled timing and logic means, such that video signals can be viewed on the display and alternatively outputted to the digital signal means.

11. A method for controlling a CCD image sensor to obtain lines of video images synchronized in groups of even and odd fields for display in accordance with a television standard and alternatively to obtain video images which are outputted from the CCD image sensor sequentially line-by-line and frame-by-frame, the method comprising the steps of:
generating standard sync and control signals as required by a standard television display;
generating a pixel clock;
generating a plurality of timed pulses referenced to the standard signals;
generating horizontal CCD control signals from a logical combination of the pixel clock and ones of the timed pulses;
generating vertical CCD control signals having a selectable number of vertical shift pulses from a logical combination of ones of the timed pulses;
generating vertical CCD control signals having a selectable number of frame shift pulses from a logical combination of ones of the timed pulses and the standard signals; and
selecting the numbers of vertical shift pulses and frame shift pulses in accordance with a purely sequential mode of outputting single horizontal lines of pixel image signals from the CCD image sensor and alternatively in accordance with a modified mode of outputting lines of pixel image signals in groups of even and odd fields of a frame of a television picture.

12. The method of claim 11 wherein:
single vertical shift pulses corresponding respectively to each line of the CCD image sensor are generated for the sequential mode of operation, and a plurality of vertical shift pulses corresponding respectively to multiple lines of the CCD image sensor are generated for the modified mode of operation; and
a single frame shift pulse corresponding to a frame of lines of the CCD image sensor is generated for the sequential mode of operation, and a plurality of frame shift pulses corresponding respectively to even and odd fields of a television picture frame are generated in the modified mode of operation.

13. The method of claim 11 further comprising the step of selectively switching the video signals to a television display in the modified mode of operation and alternatively switching the video signals to digital imaging equipment in the sequential mode of operation.

* * * * *